April 28, 1953 H. S. DAVIS 2,636,906
CONVERSION OF ETHYLENE OXIDE TO VALUABLE PRODUCTS
Filed March 5, 1948
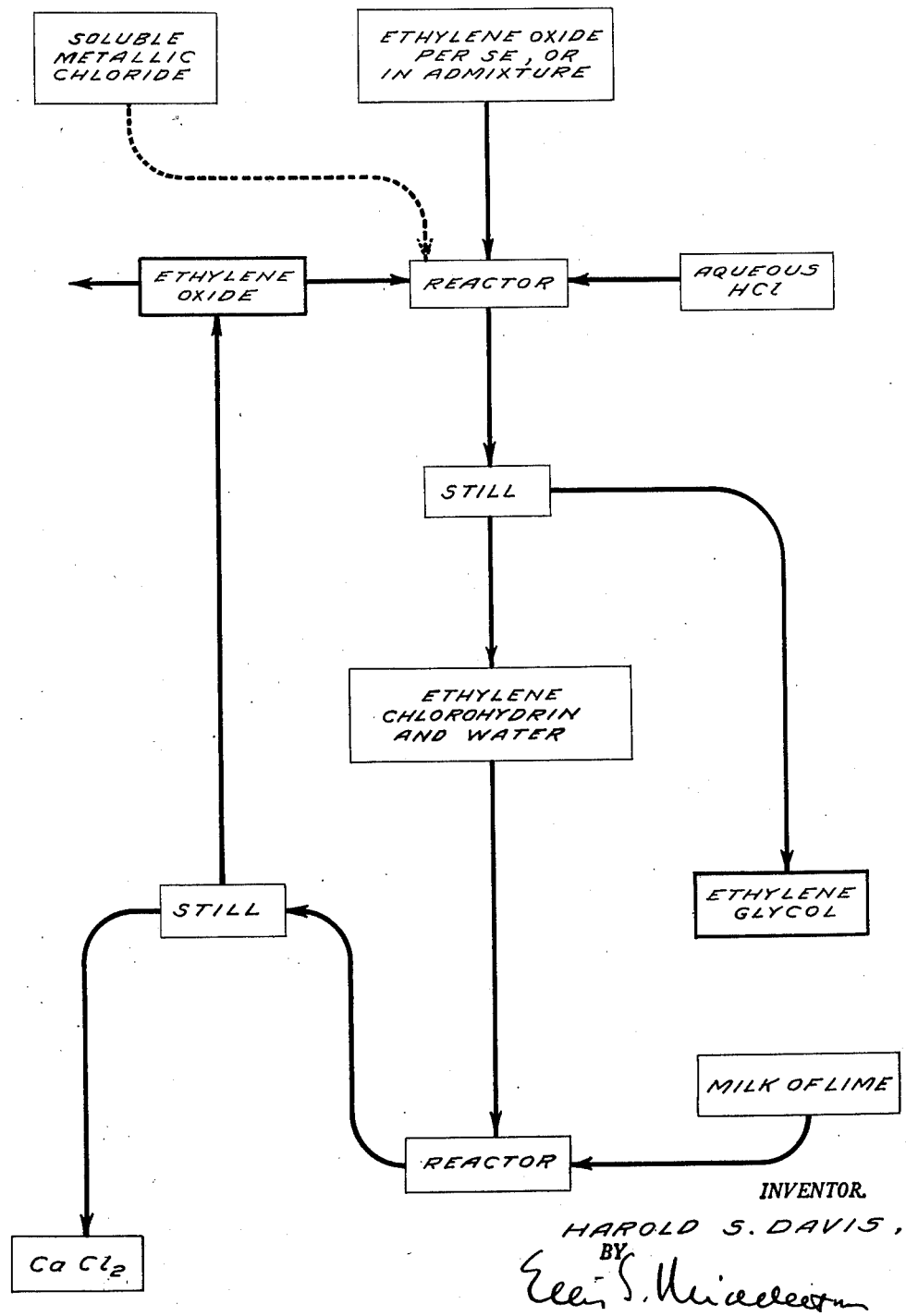
INVENTOR.
HAROLD S. DAVIS,
BY
ATTORNEY Patented Apr. 28, 1953

2,636,906

UNITED STATES PATENT OFFICE 2,636,906

CONVERSION OF ETHYLENE OXIDE TO VALUABLE PRODUCTS

Harold S. Davis, Riverside, Conn., assignor to American Cyanamid Company, New York, N. Y., a corporation of Maine Application March 5, 1948, Serial No. 13,117

4 Claims. (Cl. 260—633)

This invention relates to the preparation of valuable products using ethylene oxide and preferably the dilute ethylene oxide in the gases which result from the direct oxidation of ethylene by oxygen containing gases in the presence of a catalyst. A typical gas from this operation contains, in percentages by volume, ethylene oxide 2.2%, carbon dioxide 3.6%, ethylene 0.9%, the remainder being largely nitrogen with some water vapor.

One object of the invention is to absorb ethylene oxide selectively and completely from a gas mixture containing it, leaving the other compounds, particularly carbon dioxide and ethylene, substantially untouched. It is then possible to obtain more value from the ethylene in the gas from which ethylene oxide has been removed e. g. by recycling the gas, after proper additions, in the direct oxidation procedure, or the ethylene can be separated from the gas by known art in a more concentrated and useful form.

Another object of the invention is the simultaneous production of more than one valuable product from ethylene oxide in very high yield on the total ethylene oxide consumed.

Another object of the invention is the production of a neutral product solution, free from dissolved salts, which can be distilled without corrosive tendencies and without the deposition of solid salts in the apparatus during the distillation.

Another object of the invention is the production of high grade ethylene glycol.

Another object of the invention is the production from a dilute ethylene oxide gas mixture of a high grade or concentrated ethylene oxide through an aqueous solution of ethylene chlorohydrin by heating with milk of lime according to known art.

Another object of the invention is a simple method for utilizing free hydrochloric acid in the aqueous solution of ethylene chlorohydrin which results from the reaction of ethylene with a dilute solution of chlorine and which aqueous solution is the main primary product in the commercial process for manufacturing ethylene chlorohydrin from ethylene.

These objects are accomplished by scrubbing ethylene oxide or gases containing it with aqueous hydrochloric acid. The ethylene oxide is rapidly and selectively absorbed by the solution and reacts with it to give glycol and ethylene chlorohydrin practically quantitatively.

Preferably the absorbing solution is maintained in contact with ethylene oxide until the solution becomes neutral. The ethylene chlorohydrin and glycol in the solution are then separated. This may be accomplished by distillation and it has been found that all the ethylene chlorohydrin tends to come over in the first part of the distillate as an azeotrope with water at 97–98° C., then the remainder of the water distills over and all the glycol remains behind. The distillate of ethylene chlorohydrin and water, particularly the first part which is rich in chlorohydrin, is very suitable for making pure ethylene oxide by heating it with milk of lime. Therefore, in effect, while making glycol from part of the dilute ethylene oxide, all the remainder is recovered as pure concentrated ethylene oxide. Hitherto, no satisfactory method for doing this has been developed and commentators on extensive German practice actually state that it appears impossible to recover pure ethylene oxide directly in industrial scale from the gas stream.

Hitherto, the most successful method for utilizing dilute ethylene oxide has been by scrubbing the gases with an aqueous solution containing dilute sulfuric acid. The ethylene oxide is rapidly absorbed and ethylene glycol with some polyglycol is produced. Apart from the fact that it gives only glycol, this method has the serious disadvantage that the primary product solution is acidic. Before distilling to recover pure glycol, it is necessary to neutralize all the sulfuric acid with, for instance, caustic soda. The resulting sodium sulfate precipitates out gradually as distillation proceeds and greatly complicates the operations.

It has now been found that ethylene oxide reacts equally fast with dilute hydrochloric acid, two overall reactions taking place simultaneously.

(A) Chlorohydrin formation
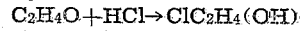
(B) Glycol formation
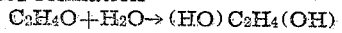

If sufficient ethylene oxide is supplied and if the rapid reactions are allowed to run to completion, then all the free HCl is used up and the product is a neutral solution of ethylene glycol and ethylene chlorohydrin. This could not have been foreseen. Nor could it have been foreseen that the ethylene glycol and ethylene chlorohydrin in an aqueous solution of the two could be easily and completely segregated by distillation, that is to say that there is no ternary azeotrope of the three components.

Reference is here made to the flow sheet in the drawing which illustrates a preferred manner of practising the invention.

In the flow sheet, ethylene oxide, either per se or in admixture with other gases such as that resulting from the direct oxidation of ethylene with oxygen of which a gas containing 2.2% ethylene oxide, 3.6% carbon dioxide, 0.9% ethylene and the remainder largely nitrogen with some water vapor is typical, is passed along with aqueous hydrochloric acid into a reactor. At the start of the operation, the reactor may contain simply aqueous hydrochloric acid although in the cyclic process, it will include an aqueous solution of ethylene chlorohydrin, HCl and perhaps some ethylene glycol. The liquid in the reactor acts to scrub out the ethylene oxide which reacts with the hydrochloric acid to form ethylene chlorohydrin. Due to the fact that there is a considerable quantity of water present, ethylene glycol also forms. The reaction may continue until all of the hydrochloric acid is used up, at which time the contents of the reactor will be neutral. It is preferable to carry out the absorption of the ethylene oxide in two stages. In the first where the main absorption takes place, free hydrochloric acid is maintained in the absorbing liquid in order to promote the reactions. In the second, the still acid solution from the first stage is contacted with ethylene oxide, preferably countercurrently, until it becomes neutral. The reaction products are fractionally distilled, an azeotrope of ethylene chlorohydrin and water coming over first. This is then followed by water containing little or no ethylene chlorohydrin while the ethylene glycol produced remains in the still and may be recovered as such.

The ethylene chlorohydrin and water taken from the still may then be passed to a reactor and lime or milk of lime added to form ethylene oxide and calcium chloride. The ethylene oxide may then be returned to the cycle or recovered as a concentrated gas and used for any purpose. The calcium chloride may be recovered or disposed of as desired.

The reaction of ethylene oxide with hydrochloric acid is very fast but by no means instantaneous. This can be shown easily by adding definite quantities of concentrated hydrochloric acid to aqueous solutions of ethylene oxide in a Dewar flask and observing the rise in temperature with time in the reacting mixture. The rate of reaction increases rapidly with the temperature. Indeed if too much of the reactants is used, the solution may suddenly rise to boiling temperature in a few seconds.

Calculations indicate that the heats involved by the reactions are about 20,200 calories per gram mole of glycol and 11,900 calories per gram mole of chlorohydrin, and the order of these values has been confirmed by calorimetric measurements. Since sulfuric acid directs the reaction of ethylene oxide to glycol, it might have been expected that sulfuric acid would absorb ethylene oxide somewhat faster than hydrochloric. Nevertheless, tests with normal solutions of the two acids failed to disclose any difference in the rates of the reactions except that the one with HCl started at once whereas there was always a short lag or induction period before the one with $H_2SO_4$ got under way.

The quantity of glycol relative to chlorohydrin which is produced depends upon the concentration at which the HCl is maintained in the absorbing solution. The lower this concentration and the higher the temperature, the greater will be the proportion of glycol. If a high concentration of HCl is maintained, then chlorohydrin is the main product. Indeed glycol formation can be suppressed practically entirely by maintaining a high concentration of chloride ion either by free hydrochloric acid alone or by a combination of HCl and any soluble metallic chloride, preferably the soluble chlorides of the alkali forming metals such as NaCl, $CaCl_2$ or $MgCl_2$. In this last case, absorption of the ethylene oxide and distillation of the aqueous chlorohydrin may be carried out in successive operations. Or, the two operations may be carried out concurrently and continuously, by maintaining the absorbing solution at a moderately elevated temperature where the unabsorbed gases carry out from the solution both water at the same rate at it is added and chlorohydrin at the same rate as it is produced. The chlorohydrin may then be recovered from the gases by cooling in the form of an aqueous solution.

Very valuable results can be obtained through the invention by combining the process of the hypochlorination of ethylene with that of the direct oxidation. In the former process, ethylene is contacted with a dilute solution of chlorine in water and reacts mainly according to the equation:

$$C_2H_4 + Cl_2 + H_2O \rightarrow ClC_2H_4(OH) + HCl$$

In practice, the primary effluent is a water solution containing about 5% ethylene chlorohydrin and free hydrochloric acid in chemical equivalence thereto. It is customary to treat this effluent with lime whereupon ethylene oxide is produced and waste calcium chloride is formed according to the equation:

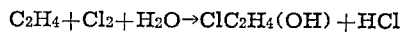
$$ClC_2H_4(OH) + HCl + Ca(OH)_2 \rightarrow$$
$$C_2H_4O + CaCl_2 + 2H_2O$$

In accordance with this invention, this primary effluent can be used to absorb the dilute ethylene oxide out of the product gases from the direct oxidation of ethylene whereupon reaction takes place according to the equation:

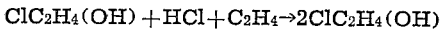
$$ClC_2H_4(OH) + HCl + C_2H_4 \rightarrow 2ClC_2H_4(OH)$$

Hence the free HCl is used up to form an equivalent quantity of chlorohydrin. The chlorohydrin is then separated by distillation in the form of an azeotrope with water and may be used to make ethylene oxide by heating with milk of lime. Thus, compared to the hypochlorination procedure above, there results twice the quantity of ethylene oxide from the same quantities of chlorine and lime. It is also of great practical importance that there is only half the quantity of waste $CaCl_2$ per unit of ethylene oxide. In effect, the extra ethylene oxide has been recovered from the dilute ethylene oxide in the direct oxidation gases. In addition, the residue from the distillation of the aqueous chlorohydrin may be high grade glycol free from dissolved salts. It too can be formed by hydrolysis of dilute ethylene oxide from the direct oxidation gases. The proportion glycol/chlorohydrin depends upon the conditions of chloride ion concentration and the temperature used in the absorption of the dilute ethylene oxide.

*Example 1*

A mixture of 10 g. of ethylene glycol, 10 g. of ethylene chlorohydrin and 80 g. of water was distilled through an efficient fractionating column. The first 31 g. of distillate contained 80% of the chlorohydrin, the next 51 g. contained 18% and the next 8 g. were pure water. There remained in the distilling flask 9.6 g. of glycol having the same refractive index as the original sample, 1.4310.

*Example 2*

A similar mixture to that used in Example 1 was rapidly distilled through a short, unpacked, relatively inefficient column. The first 50.7 g. of distillate contained 88% of the chlorohydrin and 3% was found in the next 38.5 g. The remaining 9% undoubtedly represents mechanical loss. 92% of the glycol, refractive index 1.4309, remained in the flask.

*Example 3*

Ethylene oxide was passed into 100 g. of 0.98 N(3.5%) HCl at about 50° C. It was rapidly absorbed with evolution of heat which was removed by cooling. The solution soon became neutral and 15.5 g. of ethylene oxide had been absorbed. The solution was now refluxed under an ice cooled, low temperature column and 4.3 g. of unreacted ethylene oxide came over at 10–11° C. The solution was then distilled and analyzed according to the procedure in Example 2. Ethylene chlorohydrin was found in the distillate in 93% equivalence to the HCl taken. This represents quantitative chlorohydrin formation. 10.2 g. of ethylene glycol were recovered. Its refractive index was 1.4298 and when distilled about 80% boiled at 193–200° C. The flask went to dryness at 208° C. but higher boiling material, presumably polyethylene glycols were still refluxing.

*Example 4*

In order to find the effect of the HCl concentration, tests were carried out at 20° in a manner similar to Example 3. To show the effect of temperature, the results from Example 3 are included. The "dilute" acid in test C represents the addition of 10 cc. of concentrated HCl in 1 cc. portions over 45 minutes to 90 g. of water into which ethylene oxide was being passed.

| Test | Temperature, °C. | HCl, percent | Glycol/Chlorohydrin | |
|---|---|---|---|---|
| | | | Weight ratio | Molar ratio |
| A | 20 | 35 | 0.3 | 0.4 |
| B | 20 | 3.5 | 1.0 | 1.3 |
| Example 3 | 50 | 3.5 | 1.4 | 1.9 |
| C | 20 | dilute | 1.8 | 2.3 |

The ratio glycol/chlorohydrin increases with the dilution of the HCl and is somewhat higher at 50° C. than at 20° C.

The glycol from tests B and C was purer than that in Example 3. Most of it distilled at 197–198° C. and the refractive index of this distillate was 1.4310 at 25° C.

*Example 5*

Ethylene oxide was passed into a solution containing 30% $MgCl_2$ and 4.2% HCl until the solution became neutral. After removing unreacted ethylene oxide, 43 g. of distillate were taken over and analyzed.

Ethylene oxide reacted _____ 0.132 eq.
Ethylene chlorohydrin in distillate ____ 0.132 eq.
HCl taken _____ 0.114 eq.

All the reacted ethylene oxide can be accounted for as ethylene chlorohydrin. Accordingly glycol formation must have been negligible.

There was more chlorohydrin than corresponded to the HCl taken. Presumably the extra HCl came from hydrolysis of the $MgCl_2$.

While the invention has been described with particular reference to specific embodiments, it is to be understood that it is not to be limited thereto but is to be construed broadly and restricted solely by the scope of the appended claims.

I claim:

1. The method which includes passing ethylene oxide into an aqueous solution of hydrochloric acid until a neutral solution of ethylene chlorohydrin and ethylene glycol is formed and thereafter removing ethylene chlorohydrin by distillation.

2. A cyclic method of making ethylene glycol which includes passing ethylene oxide into an aqueous solution of hydrochloric acid to form a neutral solution of ethylene chlorohydrin and ethylene glycol, distilling ethylene chlorohydrin from the reaction mixture and recovering ethylene glycol from the residue, reacting ethylene chlorohydrin with milk of lime to form ethylene oxide and returning the latter to the cycle.

3. The method which includes passing ethylene oxide into an aqueous hydrochloric acid until a neutral solution of ethylene chlorohydrin and ethylene glycol is formed.

4. The method of claim 1 in which the aqueous solution of hydrochloric acid contains a water soluble metallic chloride.

HAROLD S. DAVIS.

References Cited in the file of this patent

UNITED STATES PATENTS

| Number | Name | Date |
|---|---|---|
| 1,954,395 | Stampe | Apr. 10, 1934 |
| 2,103,849 | Heard | Dec. 28, 1937 |
| 2,188,254 | Smithuysen | Jan. 23, 1940 |
| 2,255,411 | Cohen et al. | Sept. 9, 1941 |
| 2,325,576 | Balcar | July 27, 1943 |
| 2,378,104 | Reed | June 12, 1945 |

OTHER REFERENCES

Chemical and Metallurgical Engineering, vol. 22, pp. 629–30 (1920) (Brooks).

Journal of the Society of Chemical Industry, Japan, vol. 38, p. 425 (1935).

Journal of the American Chemical Society, vol. 51 (1929), pp. 428, 429, 440, 457, 460 and 461 (Bronsted et al.).

Jour. Am. Chem. Soc., vol. 56, p. 2009 (1934) (Gebauer-Fuelnegg and Moffett).